(No Model.) 2 Sheets—Sheet 1.
W. J. KEEP.
FIRE POT FOR STOVES.
No. 382,090. Patented May 1, 1888.
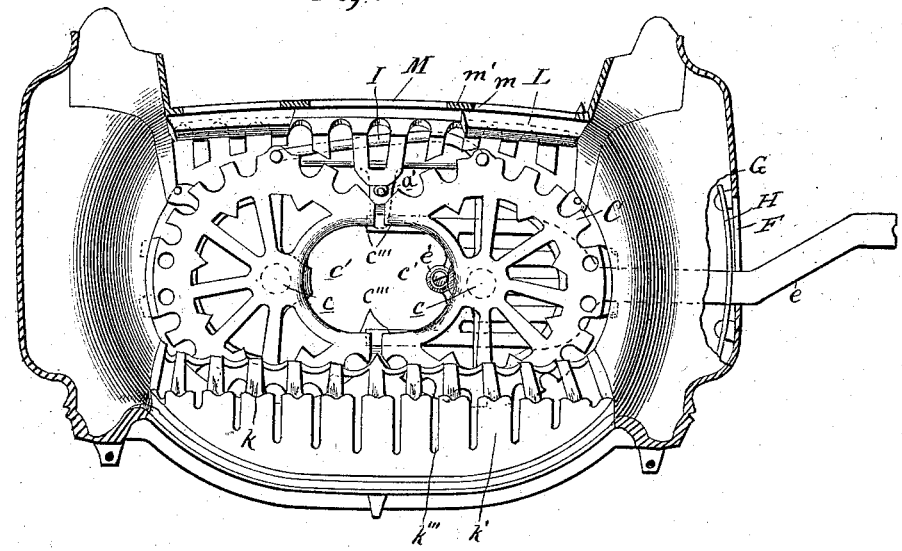
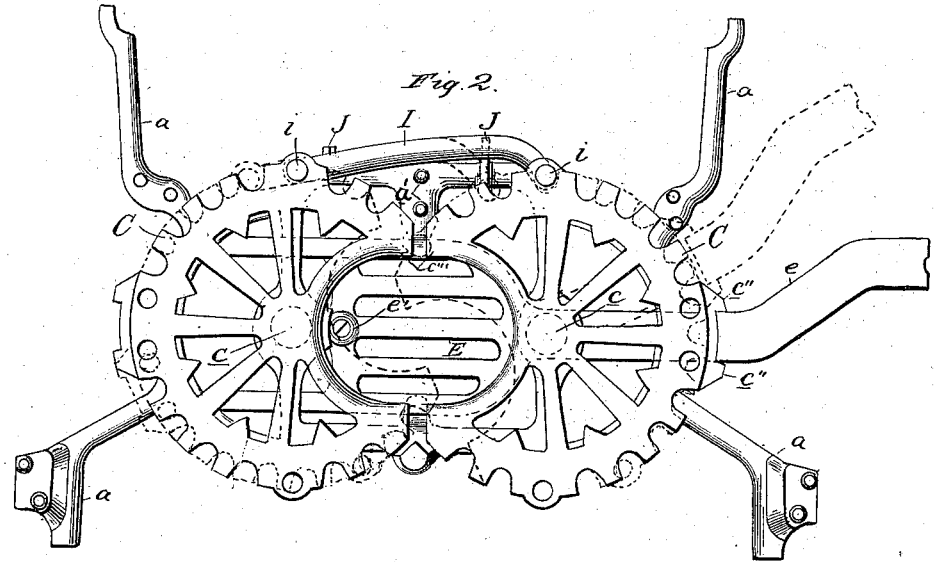
Witnesses:
Inventor,
William J. Keep.
By his Attorney,
T. J. W. Robertson (No Model.) 2 Sheets—Sheet 2.
W. J. KEEP.
FIRE POT FOR STOVES.
No. 382,090. Patented May 1, 1888.
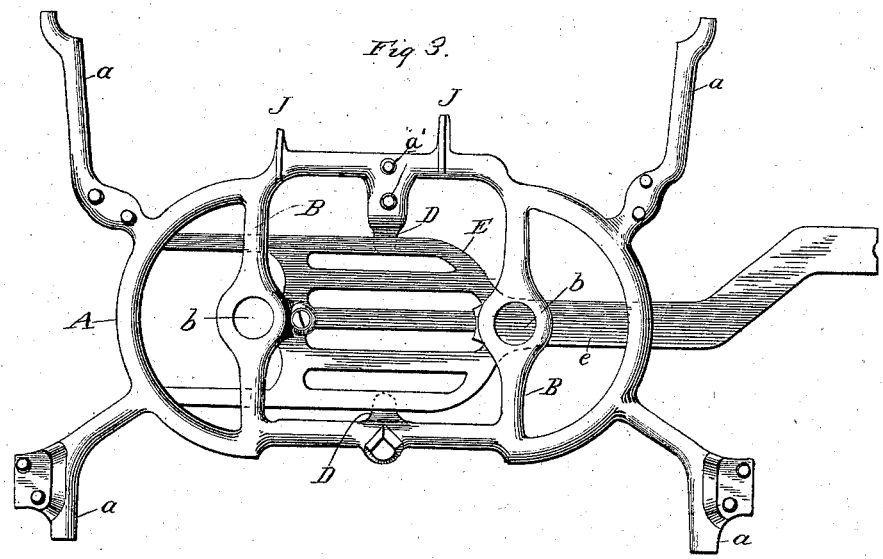
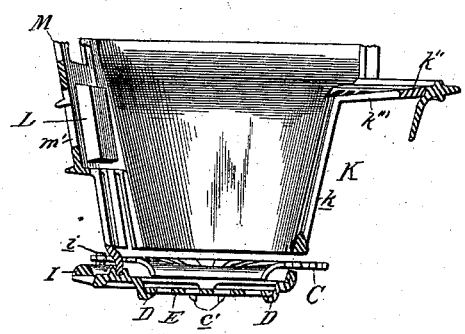
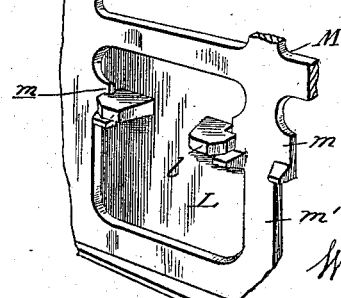

UNITED STATES PATENT OFFICE.

WILLIAM J. KEEP, OF DETROIT, MICHIGAN, ASSIGNOR TO THE MICHIGAN STOVE COMPANY, OF SAME PLACE.

FIRE-POT FOR STOVES.

SPECIFICATION forming part of Letters Patent No. 382,090, dated May 1, 1888.

Application filed February 17, 1887. Serial No. 227,932. (No model.)

*To all whom it may concern:*

Be it known that I, WILLIAM J. KEEP, a citizen of the United States, residing at Detroit, in the county of Wayne and State of Michigan, have invented certain new and useful Improvements in Fire-Pots for Stoves, of which the following is a specification, reference being had therein to the accompanying drawings, in which—

Figure 1 represents a plan of the fire-pot, partly in section and with parts removed. Fig. 2 is a plan of the grate detached. Fig. 3 is a plan of the same with the grate-sections removed, and Fig. 4 is a central vertical cross-section of the fire-pot. Fig. 5 is a perspective detail showing the mode of attaching the fire-pot lining.

This improvement relates more particularly to fire pots for cooking and heating stoves; and the invention consists in the peculiar construction, arrangement, and combination of parts hereinafter more particularly described, and then definitely pointed out in the claims.

Referring now to the details of the drawings, A represents the spider, having arms $a$ extending to the four corners of the stove, and provided with cross-bars B, having apertures $b$, in which work the pivots $c$ of the grate-sections C, each of which is provided with a preferably semicircular opening, $c'$, as shown, so as to be of crescent shape, thus leaving a dump-hole in the center of the grate.

The spider A has two downwardly and inwardly projecting lugs, D, which form bearings for a draw slide, E, which when in position closes the dump-hole formed by the openings in the sections of the grate. This draw-plate is provided with a draw-bar, $e$, which passes between lugs $c''$, depending from one of the sections of the grate, and also through a slot, F, in the side of the stove-casing G, which is covered by a follower, H, in a well-known manner. The two sections are connected together by a link, I, having upturned lugs $i$ cast or otherwise formed thereon, which work in holes formed in the grate-sections. The bottom of this link rests on lugs J, projecting from the spider, and thus the rod cannot drop out of the grate-sections as long as the latter are in position on the spider.

At $e'$ is shown a stop, which is secured by a screw to the face of the draw-slide, which, by coming in contact with the bars B, prevents the draw-slide from being pushed in too far or from being drawn too far out.

The front grate, K, is provided with the usual bars, $k$, and the top plate thereof, $k''$, has a series of slots, $k'''$, thus forming a series of short lateral wide bars, $k'$, which will be found very advantageous, for the reason that if the upper part of the grate were made solid or simply perforated, as has been proposed, the action of the fire would cause it to warp inward, whereas by the use of the slots the top of the grate is prevented from warping, and hence the grate always retains its shape. The back lining is preferably formed of a series of oblong castings, L, each formed with lugs $l$, that catch over the projections $m$ on the bars $m'$, forming part of the skeleton frame M, supported in any convenient way on the stove and provided with downwardly-projecting grate-bars, two of which are united and rest on the spider A of the grate between two upwardly-projecting lugs, $a'$, cast thereon.

It will be observed that the bar $e$ is not straight, but runs off diagonally toward the slot in the stove. The object of this is to bring the ends of the bar in line with the center of the slot F when the grate-sections are in their proper position, so that when the grate is being agitated the heels $c'''$ of the sections will move an equal distance in both directions over the opening, and thus more thoroughly break up and shake out any clinkers that may form there.

The operation of the grate is as follows: If it is desired to shake it, the shaker, of any suitable form, is fitted onto the bar $e$ and the latter vibrated, which, operating on the lugs $c''$, causes the sections to assume the positions shown in dotted lines in Fig. 2, because as one of the sections is moved by the bar $e$ the other section is moved by the link I. This movement rapidly breaks up and shakes out any accumulation of ashes or clinkers that may form there, for the kicking motion of the heels $c'''$ against the clinkers rapidly breaks them up. If the grate is to be emptied, the draw is pulled out, as shown in Fig. 1, which leaves an open space through which the ashes, &c., will readily drop, especially if the bar e be vibrated.

It is evident that my grate may be changed in construction without the exercise of invention. It is also evident that the sections may be shaken by a separate bar passed in through an opening in the opposite side of the stove from that in which the bar e enters and into the space between the lugs c'' shown on the section of the grate on that side, and that as motion is given to that section the other section will be operated by the link I. The shape of the sections of the grate, too, may be readily changed, if desired, as they may, for instance, have oblong openings instead of the semicircular ones now shown without departing from the spirit of my invention.

I am aware that it has been proposed to provide a stove with a circular grate made in two semicircular sections, which are pivoted at their edges and arranged to be moved simultaneously by a shaker-bar, and make no claim to this, as I consider my invention essentially different therefrom, inasmuch as my sections can be simultaneously rotated on independent centers, which cannot be done with the semicircular sections just referred to.

Having thus described what I now consider the preferable form of my improvement, but without limiting myself to the exact construction shown, I claim as new—

1. The combination of two substantially-circular grate-sections partially rotatable in a horizontal plane, each provided with a side opening to form a dump-hole between them, with a draw-slide for closing said dump-hole, and connected with one of said sections, whereby the said section and slide may be simultaneously operated, substantially as described.

2. The combination of the two partially rotatable grate-sections C, each having a side opening, c', and heels c''', adapted to alternately move into the dump-hole formed by said openings, substantially as described.

3. The combination, with the partially-rotatable grate-sections C, one of said sections being provided with an opening to form a dump-hole, of a vibrating draw-slide supported beneath the same and closing said dump-hole, and a bar, e, moving with said slide, and lugs c'', depending from one of said sections and receiving the bar e and transmitting motion from the bar e to said section, substantially as described.

4. The combination, with partially-rotatable grate cut away to form a dump-opening, and a spider beneath the same, provided with downwardly-projecting lugs D, of the swinging draw-slide E, arranged to slide on said lugs to close the opening and engaging the grate, substantially as described.

5. The combination, with the spider A, having cross-bars B, of the crescent-shaped sections C, one of which is provided with depending lugs and supported by and pivoted on said cross-bars, and the draw-slide E, filling the dump-hole between the crescent-shaped sections, and provided with the bar e, passing between the lugs on one of the sections, and the link I, connecting the two sections to move them simultaneously, substantially as described.

6. The combination, with a fire-pot, of a front grate comprising the vertical bars k and a plate arranged above said bars and at an angle thereto, having a series of slots, k''', forming short lateral bars k' in line with the bars k, substantially as described.

7. In a fire-pot, the combination, with the grate-support, of the frame M, supported thereby and formed with bars m', and projections m, formed on said bars, and the lining formed of castings L, having lugs l on their backs engaging said projections, substantially as and for the purposes specified.

8. The combination, with the grate-support having upwardly-projecting lugs a, of the skeleton frame M, having bars m', with projections m on their sides, and also having downwardly-projecting grate-bars passing between the lugs a', engaging said lugs, and the lining formed of castings, united to said frame by lugs l on their backs engaging the projections m, substantially as described.

In testimony whereof I affix my signature, in presence of two witnesses, this 15th day of February, 1887.

WILLIAM J. KEEP.

Witnesses:
ISAAC S. FILER,
J. E. GOODMAN.